US010639752B2

(12) United States Patent
Rasmussen

(10) Patent No.: US 10,639,752 B2
(45) Date of Patent: May 5, 2020

(54) VALVE SEAT EXTRACTION DEVICE

(71) Applicant: Erik Rasmussen, Wisconsin Rapids, WI (US)

(72) Inventor: Erik Rasmussen, Wisconsin Rapids, WI (US)

(73) Assignee: Alpha 3D LLC

( * ) Notice: Subject to any disclaimer, the term of this patent is extended or adjusted under 35 U.S.C. 154(b) by 188 days.

(21) Appl. No.: 15/904,996

(22) Filed: Feb. 26, 2018

(65) Prior Publication Data

US 2018/0281128 A1    Oct. 4, 2018

Related U.S. Application Data

(60) Provisional application No. 62/477,604, filed on Mar. 28, 2017.

(51) Int. Cl.
*B23P 19/02* (2006.01)
*B25B 27/02* (2006.01)
*B25B 27/06* (2006.01)

(52) U.S. Cl.
CPC ............ *B23P 19/025* (2013.01); *B25B 27/02* (2013.01); *B25B 27/062* (2013.01)

(58) Field of Classification Search
CPC ... B25B 27/062; B25B 27/06; B25B 27/0035; B25B 27/24; B25B 27/26; B25B 27/023; Y10T 29/49407; Y10T 29/49815; Y10T 29/49822; Y10T 29/53596; Y10T 29/53874; Y10T 29/53891
See application file for complete search history.

(56) References Cited

U.S. PATENT DOCUMENTS

| | | | | |
|---|---|---|---|---|
| 1,473,075 A * | 11/1923 | Bates | .................... | B25B 27/062 29/261 |
| 1,553,171 A * | 9/1925 | Jones | ..................... | B25B 27/02 29/280 |
| 1,570,338 A * | 1/1926 | Davis | .................... | B25B 27/062 29/262 |
| 2,341,677 A * | 2/1944 | Wass | ....................... | B25B 27/06 29/265 |
| 2,697,273 A * | 12/1954 | Clarke | .................. | B25B 27/023 29/261 |
| 3,252,210 A * | 5/1966 | Bowden | .................. | B25B 27/24 29/267 |
| 4,429,447 A * | 2/1984 | Davis | ..................... | B25B 27/06 29/262 |
| 5,165,156 A * | 11/1992 | Shultz | ....................... | B25B 9/00 29/258 |
| 5,301,409 A * | 4/1994 | Laframboise | ........... | B25B 5/147 29/275 |
| 5,533,245 A | 7/1996 | Stanton | | |
| 2015/0283689 A1 * | 10/2015 | Weaver | ................ | B25B 27/062 29/890.121 |

* cited by examiner

*Primary Examiner* — Tyrone V Hall, Jr.
(74) *Attorney, Agent, or Firm* — Boyle Fredrickson, S.C.

(57) ABSTRACT

A valve seat puller provides jaws for expanding on a first side of a valve seat to engage that seat in a first reaction for removal of the seat in a second direction.

10 Claims, 7 Drawing Sheets

VALVE SEAT EXTRACTION DEVICE

CROSS REFERENCE TO RELATED APPLICATION

This application claims benefit of U.S. provisional application 62/477,604 filed Mar. 28, 2017, and hereby incorporated by reference

BACKGROUND OF THE INVENTION

The present invention relates generally to tools for the removal of valve seats and in particular to a valve seat puller useful, for example, in the petroleum industries.

Pumps used for the pumping of fluid used in oil and natural gas extraction operations may include valve seats that wear over time and must be replaced. These valve seats are usually press fit into a casting or the like and must be pulled free from within the casting using considerable force, for example, obtained through a hydraulic cylinder.

Valve seat pullers are known which can extend into a casting and pass through a valve seat to extract the valve seat. The pullers include jaws with outwardly extending teeth for engaging a backside of the valve seat and for providing a shaft which can attach to a hydraulic cylinder to apply the necessary force to the valve seat. Because of the considerable force applied to the valve seat, a method of preventing the jaws from retracting during this process may be required.

U.S. Pat. No. 9,302,380 hereby incorporated by reference describes a valve seat puller where the jaws are pressed outward by a tapered cone attached to the valve puller shaft. When the shaft is pulled upward after the jaws have been fit through a valve seat, the cone shaft urges the jaws outward with a pressure comparable to that required for the extraction.

SUMMARY OF THE INVENTION

The present invention provides a valve seat puller eliminating the need for a cumbersome cone shaft which may require extra clearance beneath the valve seat for operation and whose movement relative to the jaws makes the application of downward pressure on the seat puller, necessary to engage with the valve seat, more difficult. Instead, the present invention provides a puller body attached to the upper ends of the jaws holding the jaws in the extended position through a combination of jaw support surfaces that bias the lower edges of the jaws outward with upward force and a positive locking through downward extension of the shaft into the puller body. The invention also provides an ability to release the shaft from the puller body to permit faster setup and removal of the valve seat.

Specifically, the present invention provides a valve seat puller having a first and second jaw extending along an insertion axis and pivoting with respect each other so that lower ends of the first and second jaws may move together and apart perpendicular to the insertion axis, the lower ends of the first and second jaws including outwardly extending ledges. A puller body attaches to upper ends of the first and second jaws and communicates with a shaft extendable along the insertion axis to guide the first and second jaws to a valve seat. The puller body allows the first and second jaws to move together to pass through the valve seat in an engagement mode and holds the lower ends of the first and second jaws apart so that the ledges engage a backside of the valve seat for removal of the valve seat in a removal mode.

It is thus a feature of at least one embodiment of the invention to provide a valve puller that can engage a valve seat without an ancillary cone expander positioned between the jaws.

The first and second jaws may be attached to each other by a transversely extending hinge allowing the first and second jaws to pivot about a transverse axis perpendicular to the insertion axis.

It is thus a feature of at least one embodiment of the invention to provide a simple method of pivoting the jaws with respect to the puller body.

The puller body may urge the upper ends of the first and second jaws together when the puller body pulls against the upper ends of the first and second jaws in an axial motion with respect to the first and second jaws that is required for removal of the valve seat.

It is thus a feature of at least one embodiment of the invention to provide an outward force on the jaws to prevent slippage during seat extraction.

The puller body may include an axial-threaded bore for receiving the shaft therethrough so that rotation of the shaft with respect to the puller body locks the first and second jaws in separation engaging a valve seat for removal.

It is thus a feature of at least one embodiment of the invention to provide a positive locking of the jaws to prevent slippage.

The first and second jaws may attach to the puller body by means of upwardly extending T-bars fitting within corresponding transverse T-slots in the puller body.

It is thus a feature of at least one embodiment of the invention to provide a robust joint that permits the necessary motion of the first and second jaws.

The T-slots in the puller body may slope downward toward the insertion axis.

It is thus a feature of at least one embodiment of the invention to provide a simple way of biasing the jaws outward with upward force on the puller body.

The upper surface of the T-bars may engage the shaft passing through the threaded bore to lock the first and second jaws apart.

It is thus a feature of at least one embodiment of the invention to provide a simple method of locking the jaws using the shaft itself.

The valve seat puller may further include a spring biasing the lower ends of the first and second jaws apart and wherein the spring is a helical compression spring positioned below the hinge with respect to the puller body in between the first and second jaws.

It is thus a feature of at least one embodiment of the invention to provide a simple spring biasing system that protects the spring against damage.

The hinge includes a threaded hinge pin removable therefrom for separation of the first and second jaws.

It is thus a feature of at least one embodiment of the invention to permit ready disassembly of the valve seat puller for in-field cleaning or repair.

The lower ends of the first and second jaws may include a bevel surface engaging an upper lip of the valve seat with axial movement of the puller body toward the valve seat to press the lower ends of the first and second jaws together.

It is thus a feature of at least one embodiment of the invention to provide simple engagement between the valve seat puller and the valve seat through downward pressure on the shaft without ancillary motion or sliding.

These particular objects and advantages may apply to only some embodiments falling within the claims and thus do not define the scope of the invention.

DETAILED DESCRIPTION OF THE PREFERRED EMBODIMENT

Figure 1:
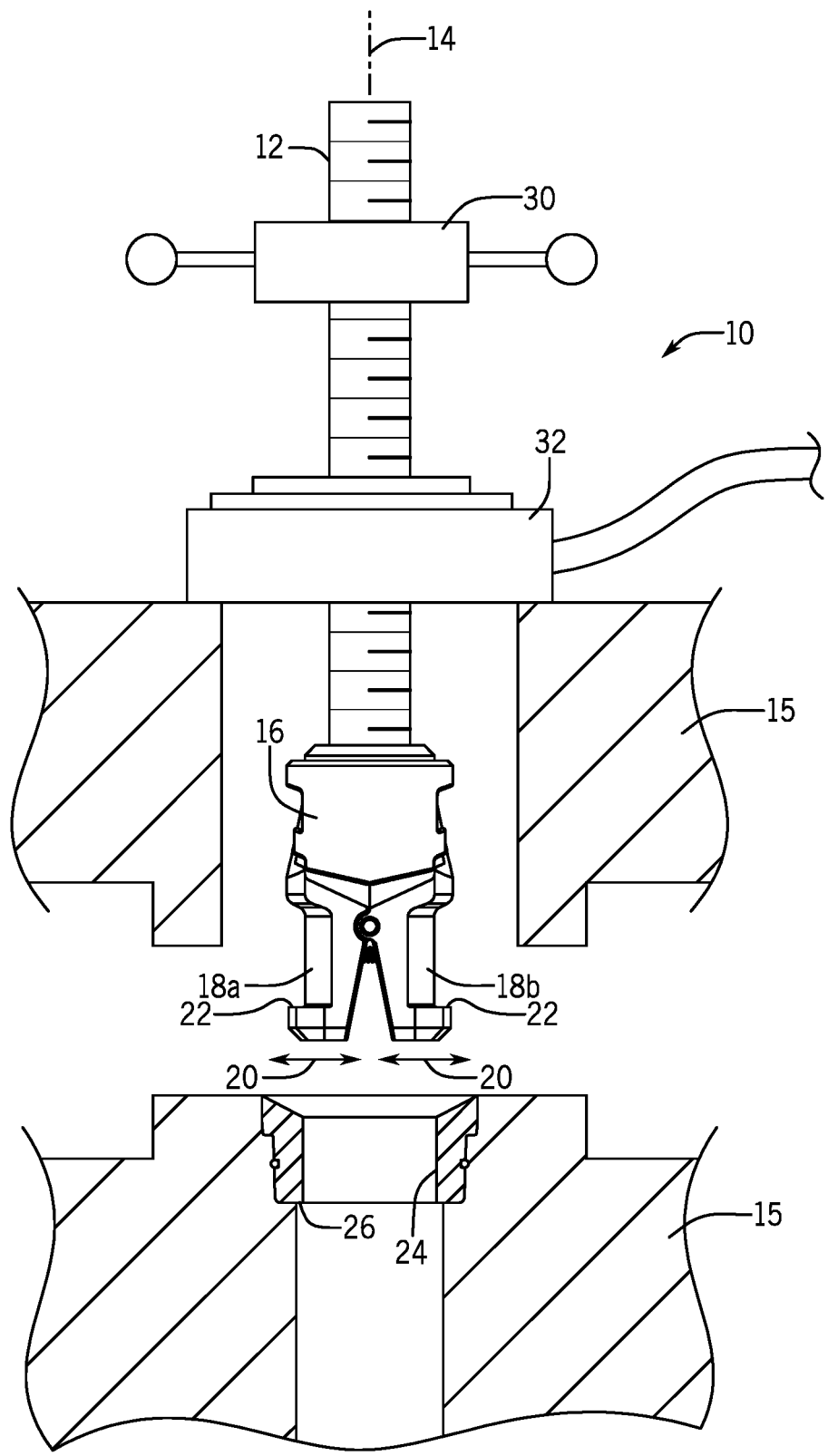
FIG. 1 is a simplified cross-section of a valve having a valve seat showing positioning of the valve seat puller of the present invention for removal of the valve seat.

Referring now to FIG. 1, a valve seat puller 10 of the present invention may include a threaded shaft 12 extending along the insertion axis 14 and attached at its lower end to a seat puller body 16 by a threaded coupling thereto. Extending from beneath the seat puller body 16 are first and second jaws 18a and 18b attached at their upper ends to the seat puller body 16 to be retained axially with respect to the seat puller body 16. Lower ends of the first and second jaws 18 hold at their lower tips outwardly extending ledges 22. The lower ends of the first and second jaws 18 may pivot with respect to each other inward and outward as indicated by arrows 20 to pass through a ring-shaped valve seat 24 and to extend on the other side of the valve seat 24 so that the ledges 22 can grip a backside 26 of the valve seat 24 to allow it to be extracted.

A collar 30 may be threaded onto the upper end of the threaded shaft 12 to support the threaded shaft 12 against a pancake hydraulic cylinder 32 allowing substantial forces to be applied to the seat puller 10 along axis 14 against a body of the valve or pump casting 15.

Figure 2:
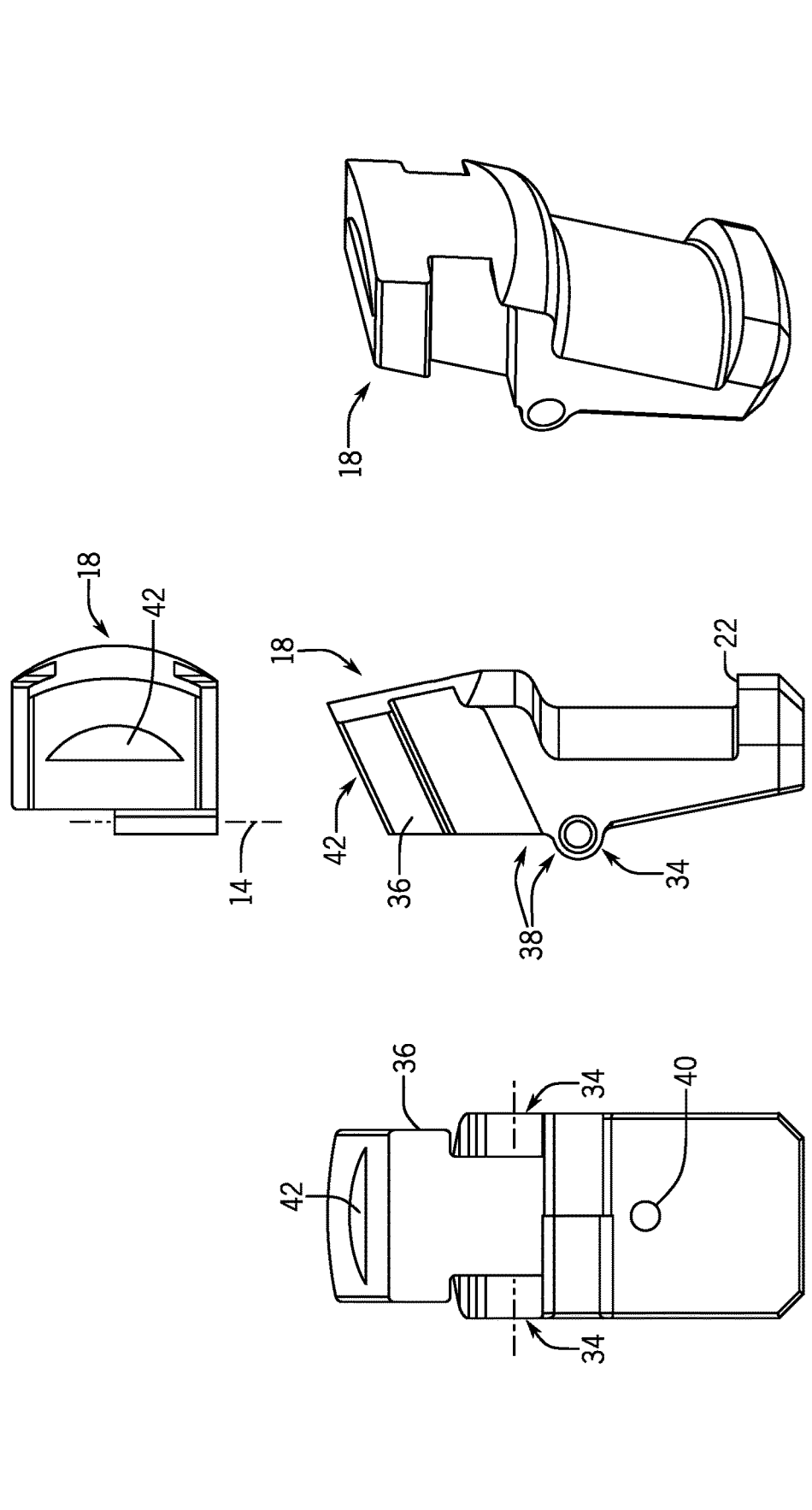
FIG. 2 is a top-, front-, left-, and right-side drawing of a valve seat puller jaw forming a left and right jaw of the valve seat puller of FIG. 1 together with a perspective rendering of the same.

Referring now to FIG. 2, each jaw 18 may attach to the other by means of mutually engaging hinge portions 34 extending toward each other from proximate inner surfaces 38 of the jaws 18. The hinge portions 34 hold the jaws 18 together to pivot with respect to each other about a transverse hinge axis perpendicular to axis 14 as retained by a hinge pin (not shown in FIG. 2).

An upper end of each jaw 18 above the hinge portions 34 may provide for a T-bar 36 generally sloping downward toward the inner surface 38 of each jaw 18.

Below the hinge portions 34 on the inner surface 38 of each jaw 18 is a blind bore 40 that may receive corresponding ends of a helical compression spring (not shown) urging the bottom ends of the jaws 18 apart. This spring is optional.

An upper surface of the T-bar 36 of each jaw 18 includes a circular indentation 42 which will interact with the lower end of the threaded shaft 12 (shown in FIG. 1) to lock the jaws 18 in the open position as will be discussed below.

Figure 3:
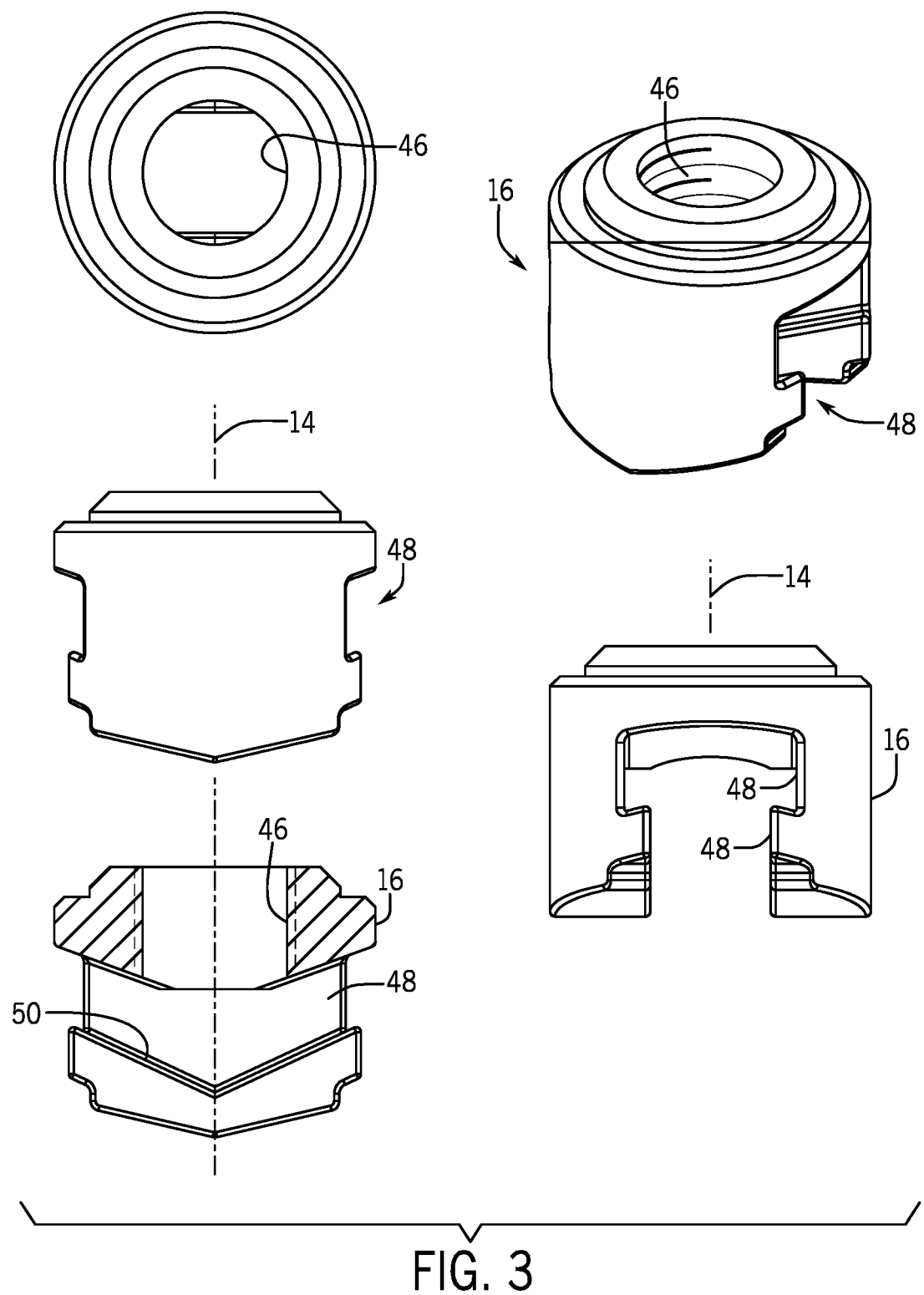
FIG. 3 is a top-, front-, and side-elevational view of a puller body of the seat puller of the present invention showing a cross-sectional elevation along line A-A and a perspective rendering of the puller body.

Referring now to FIG. 3 the body 16 may include a threaded through bore 46 threadably receiving a lower end of the threaded shaft 12 (shown in FIG. 1). Transversely extending downwardly-canted T-slots 48 slidably receive the T-bars 36 of the jaws 18 shown in FIG. 2 during the pivoting about the hinge portions 34. The T-slots 48 are over sized to allow pivoting action but have lower surfaces 50 that face upward to engage corresponding lower surfaces of the T-bars 36 biasing the T-bar 36 outward with upward force on the T-bars 36 from the body 16 and, accordingly, biasing the lower ends of the jaws 18 outward with upward motion of the body 16.

Figure 4:
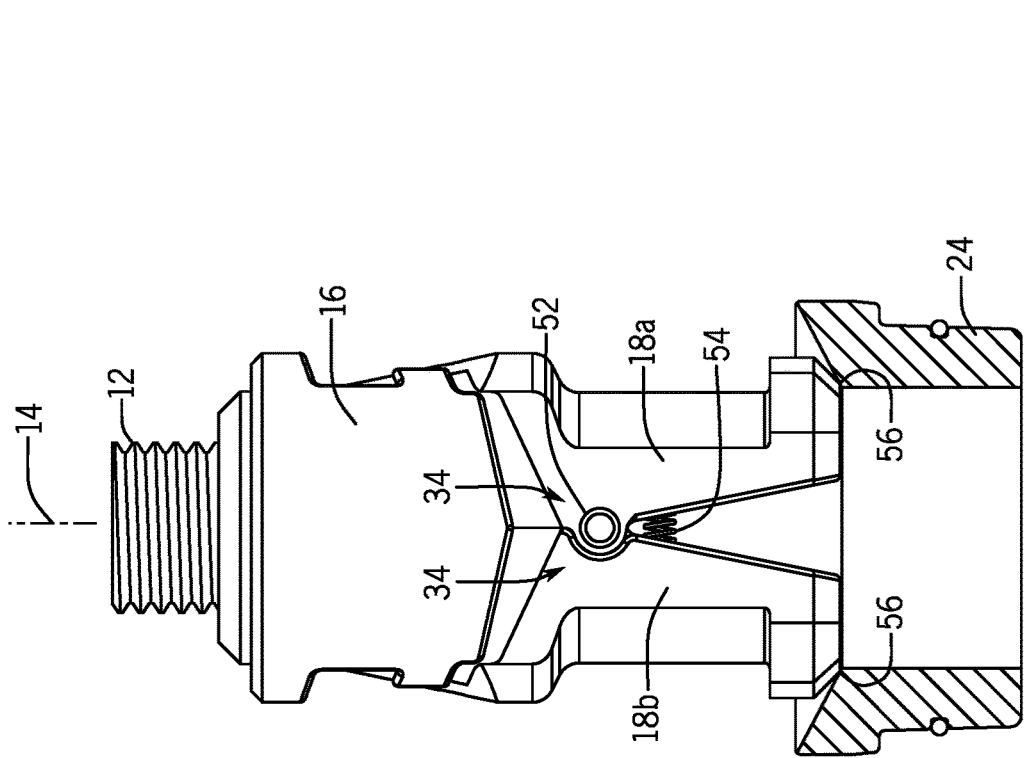
FIG. 4 is a right-side and front view of the assembled valve seat puller in partial cross-section showing a first stage of inserting the valve seat puller into a valve seat where the valve seat compresses the lower ends of the valve seat puller jaws together and showing a perspective partial cross-sectional view of the same.
Figure 4:
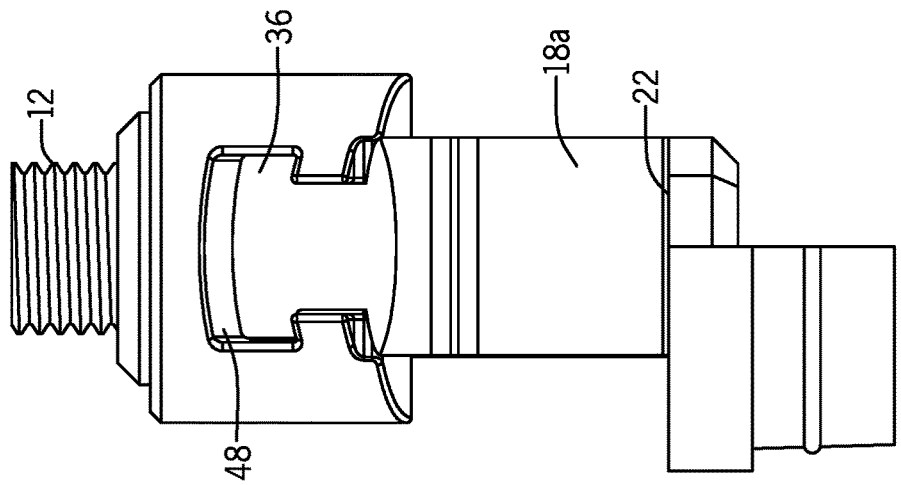
Figure 5:
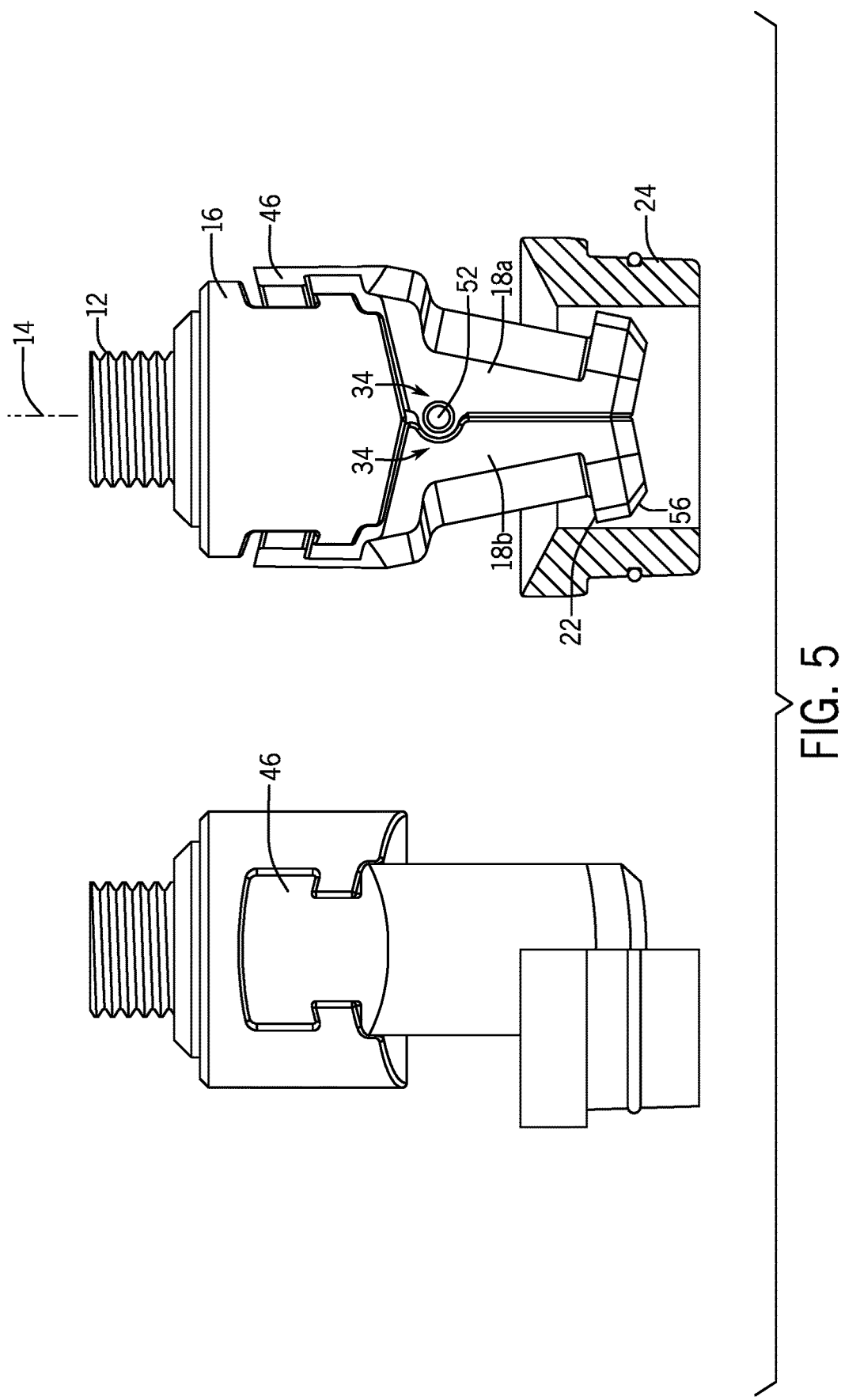
FIG. 5 is a figure similar to FIG. 4 showing the valve seat puller in partial passage through the valve seat with the valve seat puller jaws compressed together.
Figure 6:
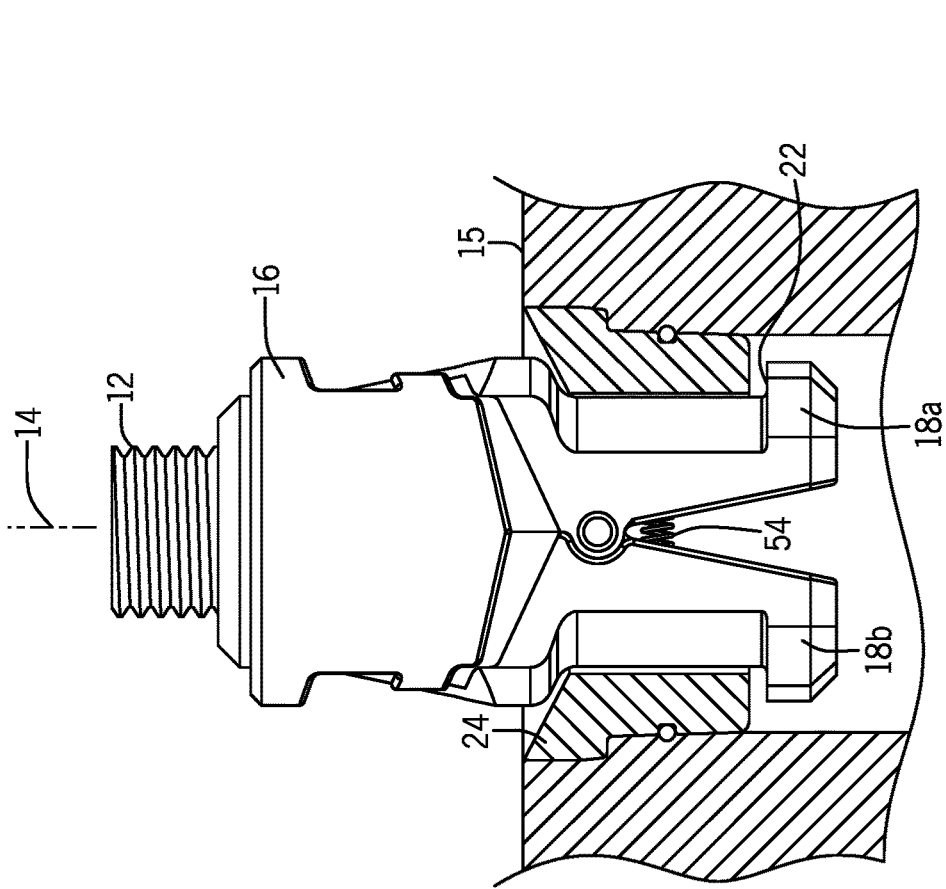
FIG. 6 is a figure similar to FIGS. 4 and 5 showing expansion of the valve seat puller jaws outward after passage through the valve seat so that ledges of the jaws engage a backside of the seat for retraction of the same.
Figure 6:
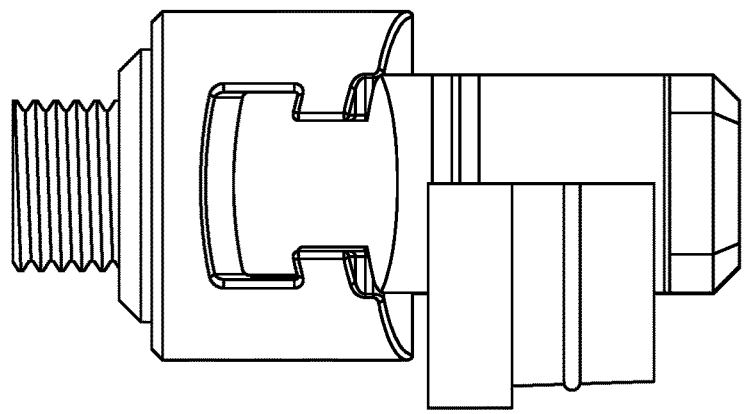
Figure 7:
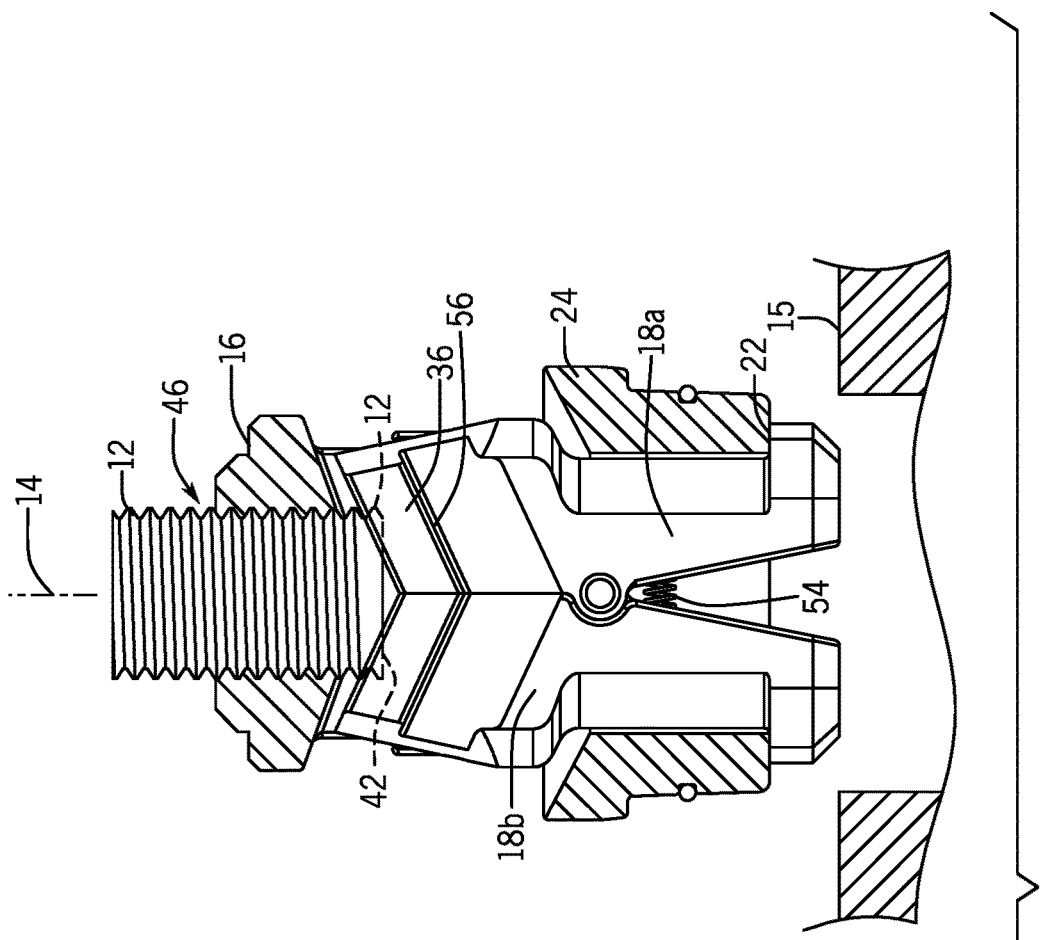
FIG. 7 is a figure similar to FIGS. 4-6 showing a threading inward of the shaft of the valve seat puller into the puller body to lock valve seat jaws in an extended position.
Figure 7:
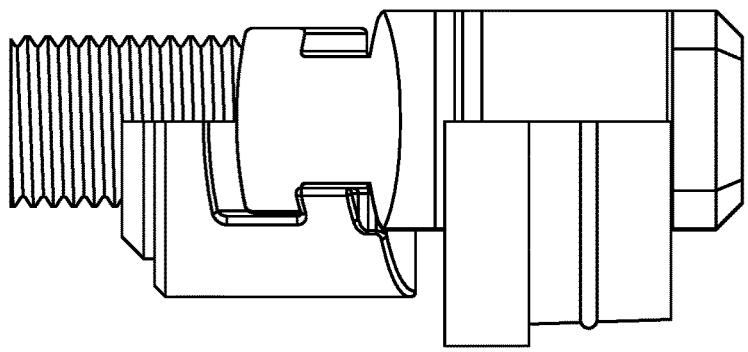

Referring now to FIG. 4, when the jaws 18a and 18 are assembled together at the hinge portions 34 by means of a threaded hinge pin 52, the installed compression spring 54 urges the lower ends of the jaws 18 outward. Beveled surfaces 56 on the outer lower edges of the ledges 22 of the jaws 18 engage comparable bevels on the valve seat 24 so that downward force on the body 16 by the threaded shaft 12 causes the lower ends of the jaws 18 to move inward as shown in FIG. 5 to pass through the valve seat. As shown in FIG. 6, the spring 54 then urges the jaws 18 apart so that the ledges 22 may overlap exposed back surfaces of the valve seat 24 allowing the valve seat 24 to be pulled upward by force on the threaded shaft 12. Any such force causes engagement between lower beveled surfaces of the T-bars 36 tending to separate the lower ends of the jaws 18. In addition, the threaded shaft 12 maybe threaded downward through the bore 46 of the body 16 to engage the flats 42 on the upper surfaces of the T-bar 36 locking the lower ends of the jaws 18 in their outermost position. At this point, as shown in FIG. 7, upward force on the threaded shaft 12 causes retraction of the valve seat for removal.

Referring again to FIG. 1 it will be appreciated that the ability to unscrew threaded shaft 12 from the body 16 simplifies assembly of the puller 10 around the hydraulic cylinder 32 without the need to completely remove the collar 30. It will also be appreciated that engagement of the puller 10 with the valve seat 24 requires very little clearance beneath the valve seat.

The components of the seat puller 10 may be fabricated from material such as steel to provide necessary strength for this operation.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What I claim is:

1. A valve seat puller comprising:
a first and second jaw extending along an insertion axis and pivoting with respect to each other so that lower ends of the first and second jaws may move together and apart perpendicular to the insertion axis, lower ends of the first and second jaws including outwardly extending ledges; and
a puller body attached to upper ends of the first and second jaws and communicating with a shaft extendable along the insertion axis to guide the first and second jaws along the insertion axis to a valve seat, the puller body allowing the first and second jaws to move together to pass through the valve seat in engagement mode and holding the lower ends of the first and second jaws apart so that the ledges engage a backside of the valve seat for removal of the valve seat in a removal mode;
wherein the puller body includes an axial threaded bore for threadably receiving the shaft therethrough so that rotation of the shaft with respect to the puller body locks the first and second jaws in separation engaging a valve seat for removal; and
wherein rotation of the shaft through the threaded bore presses down on upwardly facing surfaces of upper ends of the first and second jaws to lock the lower ends of the first and second jaws in separation by contact between a lower end of the shaft and the upwardly facing surfaces.

2. The valve seat puller of claim 1 wherein the first and second jaws are attached to each other by a transversely extending hinge allowing the first and second jaws to pivot about a transverse axis perpendicular to the insertion axis.

3. The valve seat puller of claim 2 wherein the puller body urges the upper ends of the first and second jaws together when the puller body pulls against the upper ends of the first and second jaws in axial motion with respect to the first and second jaws required for removal of the valve seat.

4. The valve seat puller of claim 2 wherein the hinge includes a threaded hinge pin removable therefrom for separation of the first and second jaws.

5. The valve seat puller of claim 1 wherein lower ends of the first and second jaws include a bevel surface engaging an upper lip of the valve seat with axial movement of the puller body toward the valve seat to press the lower ends of the first and second jaws together.

6. The valve seat puller of claim 1 wherein the puller body attaches to the shaft with a joint-resisting axial sliding therebetween.

7. A valve seat puller comprising:
a first and second jaw extending along an insertion axis and pivoting with respect to each other so that lower ends of the first and second jaws may move together and apart perpendicular to the insertion axis, lower ends of the first and second jaws including outwardly extending ledges; and
a puller body attached to upper ends of the first and second jaws and communicating with a shaft extendable along the insertion axis to guide the first and second jaws along the insertion axis to a valve seat, the puller body allowing the first and second jaws to move together to pass through the valve seat in engagement mode and holding the lower ends of the first and second jaws apart so that the ledges engage a backside of the valve seat for removal of the valve seat in a removal mode;
wherein the first and second jaws are attached to each other by a transversely extending hinge allowing the first and second jaws to pivot about a transverse axis perpendicular to the insertion axis;
wherein the puller body urges the upper ends of the first and second jaws together when the puller body pulls against the upper ends of the first and second jaws in axial motion with respect to the first and second jaws required for removal of the valve seat;
wherein the puller body includes an axial threaded bore for threadably receiving the shaft therethrough so that rotation of the shaft with respect to the puller body locks the first and second jaws in separation engaging a valve seat for removal;
wherein the first and second jaws attach to the puller body by means of upwardly extending T-bars fitting within corresponding transverse T-slots in the puller body.

8. The valve seat puller of claim 7 wherein the T-slot in the puller body angles downward toward the lower ends of the jaws as one moves toward the insertion axis.

9. The valve seat puller of claim 7 wherein upper surfaces of the T-bars engage the shaft passing through the threaded bore to lock the first and second jaws apart.

10. A valve seat puller comprising:
a first and second jaw extending along an insertion axis and pivoting with respect to each other so that lower ends of the first and second jaws may move together and apart perpendicular to the insertion axis, lower ends of the first and second jaws including outwardly extending ledges; and
a puller body attached to upper ends of the first and second jaws and communicating with a shaft extendable along the insertion axis to guide the first and second jaws along the insertion axis to a valve seat, the puller body allowing the first and second jaws to move together to pass through the valve seat in engagement mode and holding the lower ends of the first and second jaws apart so that the ledges engage a backside of the valve seat for removal of the valve seat in a removal mode;
wherein the first and second jaws are attached to each other by a transversely extending hinge allowing the first and second jaws to pivot about a transverse axis perpendicular to the insertion axis;
further including a spring biasing the lower ends of the first and second jaws apart and wherein the spring is a helical compression spring positioned below the hinge with respect to the puller body in between the first and second jaws.

* * * * *